US006973511B2

(12) United States Patent
Damron et al.

(10) Patent No.: US 6,973,511 B2
(45) Date of Patent: Dec. 6, 2005

(54) SYSTEM AND METHOD FOR DUAL STAGE PERSISTENT RESERVATION PREEMPTION PROTOCOL

(75) Inventors: Timothy M. Damron, Austin, TX (US); Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 10/112,481

(22) Filed: Mar. 28, 2002

(65) Prior Publication Data

US 2003/0188108 A1   Oct. 2, 2003

(51) Int. Cl.[7] .............................................. G06F 3/00
(52) U.S. Cl. ..................... 710/37; 710/240; 709/226
(58) Field of Search .............................. 710/107, 240, 710/200, 36, 37; 709/217, 219, 225, 226; 711/147, 149, 150

(56) References Cited

U.S. PATENT DOCUMENTS

2003/0065782 A1 * 4/2003 Nishanov et al. ........... 709/226

OTHER PUBLICATIONS

Weber RO et al., "SCSI Primary Commands—3 (SPC-3): Working Draft", rev. 00, Project T10/1416-D, Jun. 3, 2001, 274+xix pp., pp. 23-37, Jun. 3, 2001.*
Lohmeyer J, "Proposal for Persistent Reservation", rev. 2, X3T10/95-229, http://www.t10.org, 22 pp., Sep. 28, 1995.*

* cited by examiner

Primary Examiner—Rehana Perveen
Assistant Examiner—Clifford Knoll
(74) Attorney, Agent, or Firm—VanLeeuwen & VanLeeuwen; Joseph T. VanLeeuwen; Marilyn S. Dawkins (57) ABSTRACT

A system and method for a dual stage persistent reservation preemption protocol is presented. A first adapter registers with a shared device and obtains reservation ownership of the shared device. The first adapter sets an internal reservation owner flag to "TRUE" in response to obtaining reservation ownership. The internal flag status is analyzed if the first adapter is de-registered from the shared device. When a second adapter preempts the first adapter to obtain reservation ownership, the first adapter loses its registration with the shared device. The first adapter receives an error message from the shared device in response to a request, and the first adapter checks its internal reservation owner flag status. If the first adapter's internal reservation owner flag status is "TRUE", the first adapter re-registers with the shared device.

20 Claims, 5 Drawing Sheets

SYSTEM AND METHOD FOR DUAL STAGE PERSISTENT RESERVATION PREEMPTION PROTOCOL

BACKGROUND OF THE INVENTION

1. Technical Field

The present invention relates in general to a system and method for a dual stage persistent reservation preemption protocol. More particularly, the present invention relates to a system and method for re-registering with a shared device when an adapter detects that a preemption occurred because it was a prior reservation owner of the shared device.

2. Description of the Related Art

In computer networks today, multiple computer systems may share a common device, such as a storage device. In some computer systems, a clustered storage environment is configured to allow greater flexibility of shared devices within the computer system. A clustered storage environment may combine multiple storage devices together to form a redundant ring of storage devices. Clustered storage systems typically perform multiple read and write requests through parallel access lines to the requesting computer.

Computer systems use many different protocols for communication and data transfer between adapters and shared devices on a network. As those skilled in the art can appreciate, an adapter may be a card which allows a computer system to communicate over a network, such as Fibre Channel and SCSI (Small Computer System Interface). In a clustered storage environment in which multiple adapters share a device, some protocols use various commands to coordinate simultaneous access to the shared device. For example, the SCSI protocol uses persistent reservation commands to manage access to a shared device.

Each adapter sharing the device first registers with the shared device. Using the example described above, the SCSI command to register with the shared device is "PERSISTENT RESERVE OUT" with a service action of "REGISTER". If the shared device does not currently have a reservation owner, the adapter may send commands to the shared device to obtain reservation ownership and set access to the shared device to adapter registrants only. Using the example described above, the shared device sends the command "PERSISTENT RESERVATION OUT" with a service action of "RESERVE" and a reservation type of "EXCLUSIVE ACCESS REGISTRANTS ONLY". The registered adapter becomes the reservation owner of the shared device and adapters requesting shared device access must first register.

Situations exist when it is desirable to transfer reservation ownership of a shared device from a first adapter to a second adapter. For example, the first adapter may be first to register with a shared device and obtain reservation ownership of the shared device. A second adapter who is the desired reservation owner of the shared device may register at a later time and decide to obtain reservation ownership corresponding to the shared device. Using the example described above, the second adapter sends the command "PERSISTENT RESERVATION OUT" with a service action of "PREEMPT" to the shared device.

When this occurs, reservation ownership transfers to the second adapter and the first adapter loses both its reservation ownership and its registration from the shared device. The next time the first adapter queries the shared device, the first adapter is informed that its registration is lost when it receives a "UNIT ATTENTION" error with "REGISTRATION PREEMPTED" as additional information. This error condition does not inform the first adapter of whether its registration was removed because it originally was the reservation owner or whether the adapter was malfunctioning.

A challenge found is that the preempted adapter is not able to determine whether it should re-register with the shared device or if something is actually malfunctioning with itself and should not try to re-register. Therefore, the adapter may send an error notification to an application within its computer system who is attempting to use the adapter.

What is needed, therefore, is way for an adapter to distinguish why it lost its registration with a shared device and re-register with the shared device if appropriate.

SUMMARY

It has been discovered that setting an internal reservation owner flag allows an adapter to determine whether it was preempted because it was a prior reservation owner of a shared device. After preemption, the adapter uses the internal reservation owner flag to detect its reservation ownership status prior to being preempted. If the internal reservation owner flag indicates it was a reservation owner of a shared device prior to preemption, the adapter re-registers with the shared device.

A first adapter initializes and registers with a shared device. The first adapter detects the shared device does not currently have a reservation owner. The first adapter sends reservation ownership commands to the shared device and limits access to the device to registrants only. The first adapter sets its internal reservation owner flag to "TRUE". The status of the flag is analyzed if the first adapter is preempted.

A second adapter initializes and registers with the shared device. The second adapter detects that the first adapter is the current reservation owner of the shared device. However, the second adapter is the desired reservation owner. The second adapter sends commands to the shared device to preempt the first adapter. The first adapter loses its reservation ownership and its registration as a result of the preemption.

Subsequently, first adapter queries the shared device and receives an "adapter not registered" message. The first adapter analyzes its internal reservation owner flag to determine whether it was the prior reservation owner of the shared device. If its internal reservation owner flag is "TRUE", it was the prior reservation owner and should re-register with the shared device. If its internal reservation owner flag is "FALSE", it was preempted for a reason other than being a prior reservation owner, and should not re-register.

In this case, the first adapter's reservation owner flag is set to "TRUE". The first adapter re-registers with the shared device and changes its internal reservation owner flag to "FALSE". If the first adapter is preempted again, the first adapter will detect that its internal reservation owner flag is "FALSE" and will not attempt to re-register.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
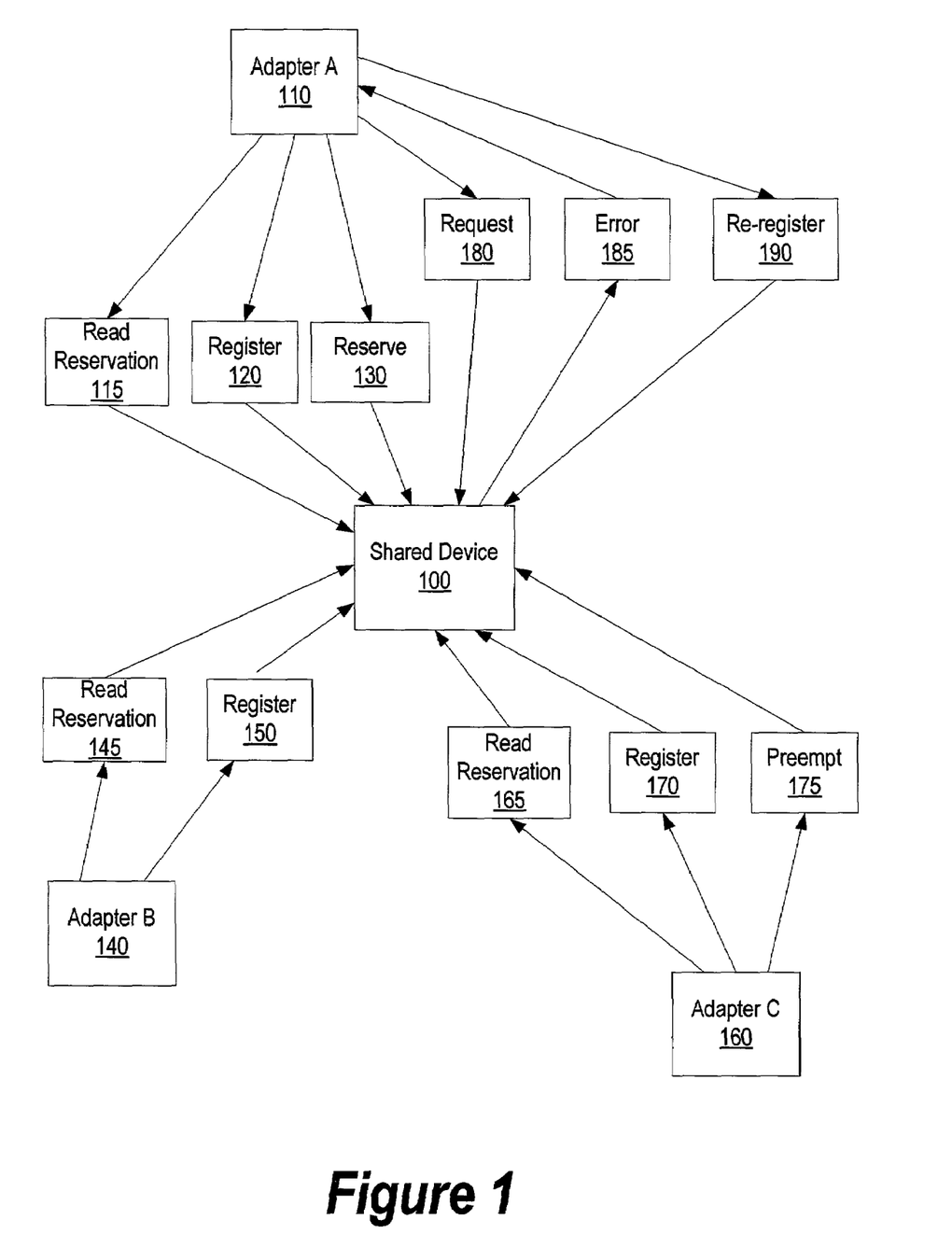
FIG. 1 is a diagram showing a second adapter preempting a first adapter to gain ownership of a shared device.

FIG. 1 is a diagram showing a second adapter preempting a first adapter to gain ownership of a shared device. Adapter A 110 shares shared device 100 with adapter B 140 and adapter C 160. The three adapters communicate using a protocol, such as SCSI or Fibre Channel. Adapter A 110 initializes and sends read reservation 115 to shared device 100 to understand the status of the shared device, such as if the shared device has a reservation owner. For example, the three adapters may be using a SCSI protocol to communicate with shared device 100 and read reservation 115 may include the command "PERSISTENT RESERVE IN" with a service action of "READ RESERVATION". Adapter A 110 registers with shared device 100 by sending register 120 to shared device 100. Using the example described above, register 120 may include the command "PERSISTENT RESERVE OUT" with a service action of "REGISTER".

Adapter A 110 detects that shared device 100 does not currently have a reservation owner from information received in response to read reservation 115. Therefore, adapter A 110 sends reserve 130 to shared device 100 in order to be the reservation owner of shared device 100. Using the example described above, reserve 130 may include the command "PERSISTENT RESERVE OUT" with a service action of "RESERVE". Reserve 130 makes adapter A 110 the reservation owner of shared device 100. Reserve 130 also includes commands to restrict access to shared device 100. Using the example described above, reserve 130 may include the command to set the reservation type to "EXCLUSIVE ACCESS REGISTRANTS ONLY". This restricts access to shared device 100 to registered adapters.

Adapter A 110 sets its internal reservation owner flag to equal "TRUE" to indicate that it is the reservation owner of shared device 100. The internal reservation owner flag status is analyzed if adapter A 110 is preempted by another adapter (see FIG. 4 and corresponding text regarding flag analysis).

Adapter B 140 initializes and sends read reservation 145 to shared device 100. Adapter B 140 registers with shared device 100 by sending register 150 to shared device 100. Using the example described above, register 150 may include the command "PERSISTENT RESERVE OUT" with a service action of "REGISTER". Adapter B 140 detects that adapter A 110 is the current reservation owner of shared device 100 from information received in response to read reservation 145. Adapter B 140 is not a desired reservation owner of shared device 100 and does not preempt adapter A 110 to obtain reservation ownership.

Adapter C 160 initializes and sends read reservation 165 to shared device 100. Adapter C 160 registers with shared device 100 by sending register 170 to shared device 100. Using the example described above, register 170 may include the command "PERSISTENT RESERVE OUT" with a service action of "REGISTER". Adapter C 160 detects that adapter A 110 is the current reservation owner of shared device 100 from information received in response to read reservation 165.

However, adapter C is a desired reservation owner of shared device 100. Adapter C 160 sends preempt 175 to shared device 100 in order to transfer reservation ownership from adapter A 110 to adapter C 160 and de-register adapter A 110. Using the example described above, preempt 175 may include the command "PERSISTENT RESERVE OUT" with a service action of "PREEMPT". In one embodiment, adapter C 160 may preempt adapter A 110 at a time other than initialization, such as after adapter C 160 sends file access requests to shared device 100.

At some point after adapter C 160 becomes the new reservation owner, adapter A 110 sends request 180 to shared device 100. Request 180 may include a request to access information located in shared device 100, such as a data structure. Shared device 100 receives request 180 and sends error 185 to adapter A 110 signifying that adapter A 110 is not currently registered with shared device 100 and that adapter A 110 has been preempted. Using the example described above, error 185 may include the SCSI error message "UNIT ATTENTION" with "REGISTRATION PREEMPTED" as additional information.

Adapter A 110 receives error 185 and checks the status of its internal reservation owner flag. Adapter A 110's internal reservation owner flag is set to "TRUE" which indicates that adapter A 110 was preempted by a second adapter in order for the second adapter to obtain reservation ownership of shared device 100. Adapter A 110 sends re-register 190 to shared device 100 to re-register with shared device 100. Using the example described above, Re-register 190 may include the SCSI command "PERSISTENT RESERVE OUT" with a service action of "REGISTER". Once re-registered with shared device 100, adapter A 110 re-sends request 180 to shared device 100.

Figure 2:
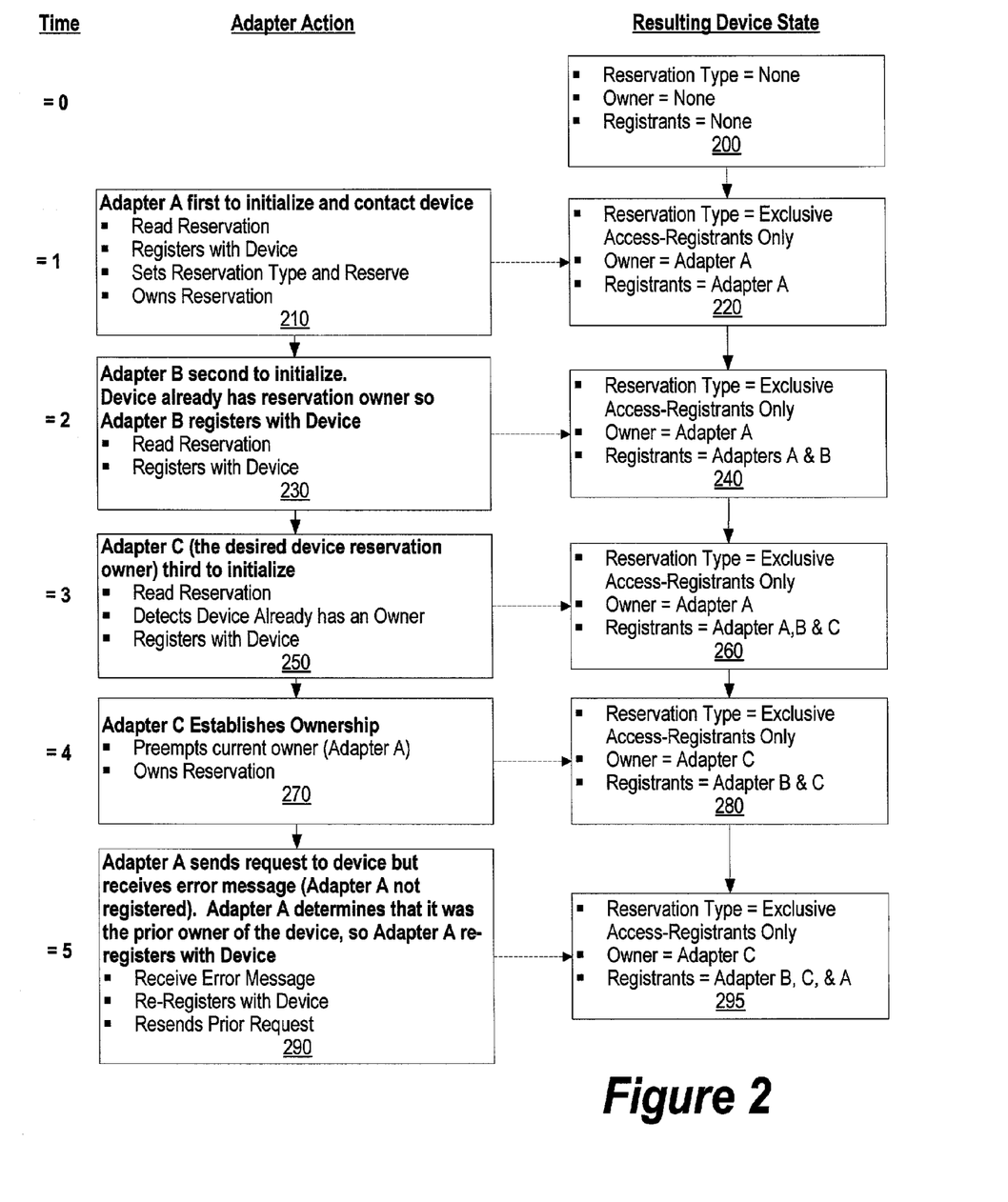
FIG. 2 shows adapter actions and shared device states during steps taken in one adapter preempting another adapter to gain reservation ownership of a device.

FIG. 2 shows adapter actions and shared device states during steps taken in a second adapter preempting a first adapter to gain reservation ownership of a shared device. At time=0, a shared device does not have registered adapters and its resulting device state in shown in state 200. State 200 indicates that the shared device does not have a reservation type, a reservation owner, or registrants. At time=1, adapter A initializes and reads the reservation information corresponding to the shared device, such as if the shared device has a current reservation owner (action 210). Adapter A registers with the shared device by sending registration commands to the shared device. For example, the SCSI command to register with a shared device is "PERSISTENT RESERVE OUT" with a service action of "REGISTER".

Adapter A detects that the shared device does not have a reservation owner from information received in response to adapter A's read reservation command. Adapter A subsequently sends commands to the shared device to obtain reservation ownership of the corresponding shared device and to restrict shared device access to registered adapters only. Using the example described above, the SCSI command to obtain reservation ownership and restrict access is "PERSISTENT RESERVE OUT" with a service action of "RESERVE" and a reservation type of "EXCLUSIVE ACCESS REGISTRANTS ONLY".

Adapter A sets its internal reservation owner flag to equal "TRUE" to signify that it is the reservation owner of the corresponding shared device. The internal reservation owner flag status is analyzed if adapter A receives an error message when it attempts I/O exchange with the shared device (described below).

State 220 shows the resulting device state of the shared device after adapter A registers and obtains reservation ownership. The corresponding reservation type is "EXCLUSIVE ACCESS REGISTRANTS ONLY" which conveys an adapter must first register with the shared device prior to access. The reservation owner is adapter A and the registrant at this time is adapter A.

At time=2, adapter B initializes and reads the reservation corresponding to the shared device (action 230). Adapter B sends registration commands to the shared device. Using the example described above, the SCSI command to register with the shared device is "PERSISTENT RESERVE OUT" with a service action of "REGISTER". Adapter B detects that adapter A is the reservation owner from information received in response to adapter B's read reservation command. Since adapter B is not a desired reservation owner, adapter B does not preempt adapter A to obtain reservation ownership of the shared device.

State 240 shows the resulting device state after adapter B registers with the shared device. The difference in the shared device state between time=1 (state 220) and time=2 (state 240) is that state 240 reflects that adapter B is now registered with the shared device. At time=2, adapter A is still registered and still the reservation owner corresponding to the shared device.

At time=3, adapter C, a desired device reservation owner, initializes and reads reservation information corresponding to the shared device (action 250). Adapter C detects that adapter A is the current reservation owner of the shared device from information received in response to adapter C's read reservation command. Adapter C sends registration commands to the shared device. Using the example described above, the SCSI command to register with the shared device is "PERSISTENT RESERVE OUT" with a service action of "REGISTER".

State 260 shows the resulting device state of the shared device after adapter C registers. The difference in the shared device status between time=2 (state 240) and time=3 (state 260) is that state 260 reflects that adapter C is now registered with the shared device. At time=3, adapter A is still registered and still the reservation owner corresponding to the shared device.

At time=4, adapter C sends commands to the shared device to preempt adapter A for reservation ownership and de-register adapter A (action 270). Using the example described above, the SCSI command for transferring reservation ownership to adapter C and de-registering adapter A is "PERSISTENT RESERVE OUT" with a service action of "PREEMPT". In one embodiment, adapter C may communicate with the shared device (i.e. request access to files) before it preempts adapter A.

State 280 shows the resulting device state of the shared device after adapter C obtains reservation ownership and adapter A is de-registered. The difference in the shared device state between time=3 (state 260) and time=4 (state 280) is that state 280 reflects that adapter C is the new reservation owner and adapter A is no longer a registered adapter with the shared device. Adapter B and adapter C are the remaining registered adapters.

At time=5, adapter A sends a request (i.e. file access request) to the shared device (action 290). The shared device detects that adapter A is not a registered adapter and sends an error message indicating that adapter A is not registered with the shared device. Using the example described above, the SCSI error message includes "UNIT ATTENTION" with "REGISTRATION PREEMPTED" as additional information. Adapter A analyzes its internal reservation owner flag status and determines that it was preempted because it was the prior reservation owner (e.g. Flag= TRUE) corresponding to the shared device (see FIG. 4 and corresponding text regarding adapter flag analysis). Adapter A sends commands to the shared device to re-register. Using the example described above, the SCSI command to re-register is "PERSISTENT RESERVE OUT" with a service action of "REGISTER". Once registered, adapter A resends the prior request to the shared device.

State 295 shows the resulting device state of the shared device after adapter A is re-registered. The difference in the shared device state between time=4 (state 280) and time=5 (state 295) is that state 295 reflects that adapter A is re-registered with the shared device.

Figure 3:
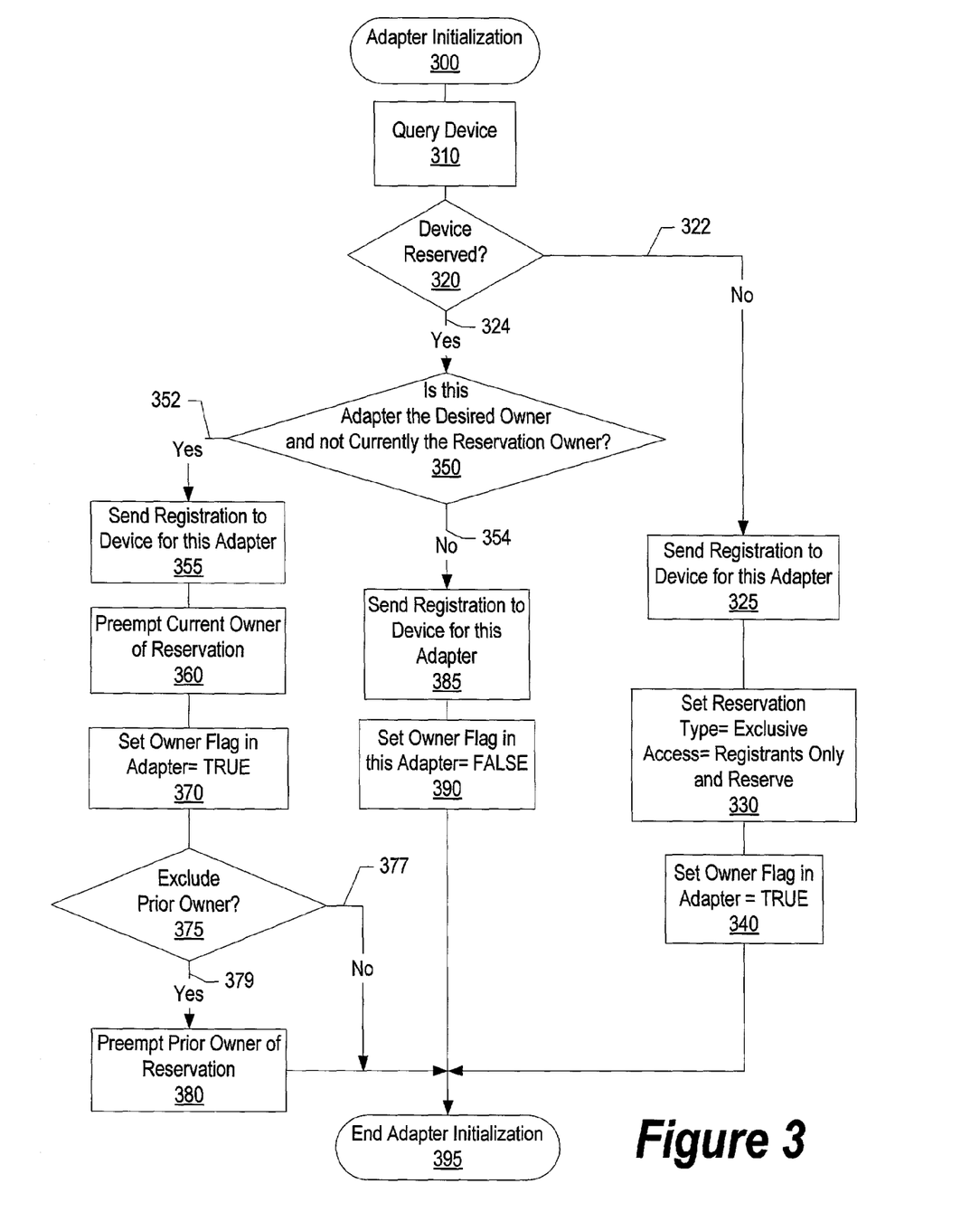
FIG. 3 is a flowchart showing an adapter registering with a device and obtaining reservation ownership if appropriate.

FIG. 3 is a flowchart showing an adapter registering with a shared device and obtaining reservation ownership if appropriate. Adapter initialization commences at 300, whereupon the adapter queries the shared device (step 310). For example, an adapter may be initializing and querying a storage device for information as to whether it has a reservation owner.

A determination is made as to whether the device has a reservation owner (step 320). For example, a first adapter may have initialized previously and obtained reservation ownership of the shared device. If the device does not have a reservation owner, decision 320 branches to "No" branch 322 whereupon the adapter registers with the shared device (step 325). For example, the adapter may be communicating with the shared device using a SCSI protocol. In this example, the adapter sends the command "PERSISTENT RESERVE OUT" with a service action of "REGISTER".

The adapter sends commands to the shared device to be the reservation owner and to restrict access to the shared device to registered adapters (step 330). Using the example described above, the adapter sends the command "PERSISTENT RESERVE OUT" with a service action of "RESERVE" and a reservation type of "EXCLUSIVE ACCESS REGISTRANTS ONLY". The adapter is now the reservation owner of the shared device and has restricted access to the device to registered adapters.

The adapter sets its internal reservation owner flag to equal "TRUE" (step 340). The adapter's internal reservation owner flag status is analyzed if the adapter receives an "adapter not registered" error message from the shared device corresponding to an adapter request (see FIG. 4 and corresponding text for further details regarding flag analysis).

On the other hand, if the shared device does have an existing reservation owner, decision 320 branches to "Yes" branch 324 whereupon a determination is made as to whether the initializing adapter is a desired reservation owner of the shared device (decision 350). Using the example described above, the initializing adapter may be a desired reservation owner but the first adapter obtained reservation ownership of the shared device prior to the initializing adapter. If the initializing adapter is not the desired reservation owner of the corresponding shared device, decision 350 branches to "No" branch 354. The initializing adapter sends registration commands to the shared device at step 385. Using the example described above, the initializing adapter sends the command "PERSISTENT RESERVE OUT" with a service action of "REGISTER".

The initializing adapter sets its internal reservation owner flag equal to "FALSE" at step 390. The adapter's internal reservation owner flag status is analyzed if the adapter receives an "adapter not registered" error message from the shared device corresponding to an adapter request (see FIG. 4 and corresponding text for further details regarding flag analysis).

On the other hand, if the initializing adapter is the desired reservation owner of the shared device, decision 350 branches to "Yes" branch 352 and the initializing adapter registers with the shared device (step 355). Using the example described above, the initializing adapter sends the command "PERSISTENT RESERVE OUT" with a service action of "REGISTER".

The initializing adapter sends preempt commands to the shared device to take over reservation ownership and de-register the current reservation owner (step 360). Using the example described above, the initializing adapter sends the command "PERSISTENT RESERVE OUT" with a service action of "PREEMPT". In one embodiment, the initializing adapter may communicate with the shared device for some period (i.e. request files, send files, etc.) before it preempts the current reservation owner.

The initializing adapter sets its internal reservation owner flag equal to "TRUE" at step 370. The adapter's internal reservation owner flag status is analyzed if the adapter receives an "adapter not registered" error message from the shared device corresponding to an adapter request (see FIG. 4 and corresponding text for further details regarding flag analysis).

A determination is made as to whether to exclude the prior reservation owner adapter from access to the device (decision 375). For example, the new reservation owner adapter may determine that the prior reservation owner adapter continues to attempt to become the reservation owner when it should not.

If the prior reservation owner adapter should not be excluded from access to the device, decision 375 branches to "No" branch 377 bypassing adapter exclusion steps. On the other hand, if the prior reservation owner adapter should be excluded from access to the device, decision 375 branches to "Yes" branch 379 whereupon a second preempt request is sent to the shared device to de-register the prior reservation owner adapter (step 380).

In one embodiment, the second preempt command occurs after the prior reservation owner adapter re-registers. When the prior reservation owner adapter re-registered for the first time, it set its internal reservation owner flag from "TRUE" to "FALSE". The second preempt command de-registers the prior reservation owner adapter for a second time. When the prior reservation owner adapter queries the shared device and receives an "adapter not registered", the adapter detects that its internal reservation owner flag status is "FALSE" and will not try to re-register with the shared device. Adapter initialization processing ends at step 395.

Figure 4:
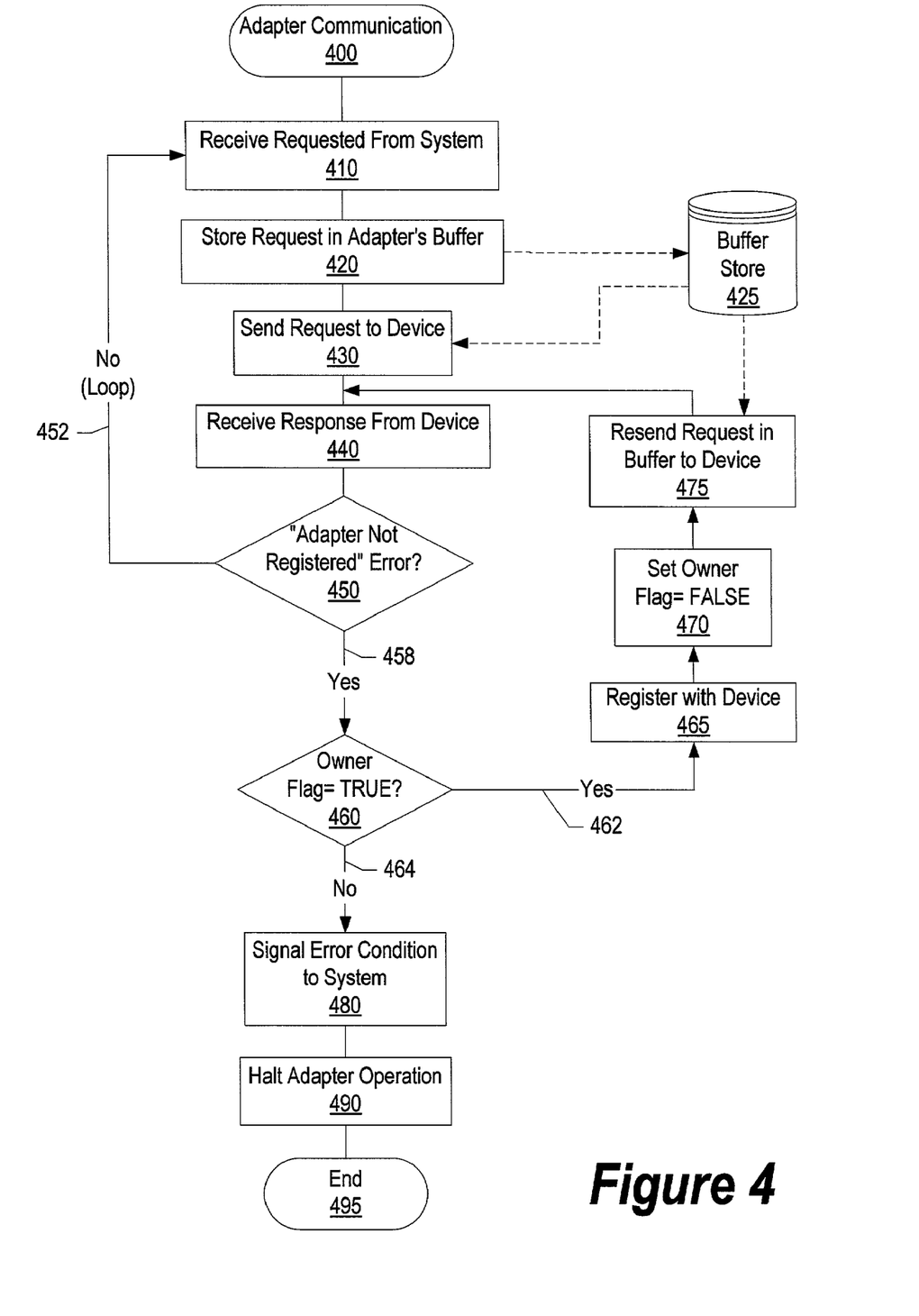
FIG. 4 is a flowchart showing steps taken in an adapter receiving an error message from a shared device and re-registering with the shared device if applicable.

FIG. 4 is a flowchart showing steps taken in an adapter receiving an error message from a shared device and re-registering with the shared device if applicable. Adapter communication processing commences at 400, whereupon a request to communicate with the shared device is received from a host system (i.e. application) at step 410. For example, the request may be a request to access a file located in the shared device. The request is stored in buffer store 425 at step 420. The request is stored in buffer store 425 in order to not lose the request in case of an error from the shared device. Buffer store 425 may be stored in a non-volatile storage area, such as non-volatile memory.

The request is retrieved from buffer store 425 and sent to the shared device at step 430. A response is received from the device at step 440. The response may be an acknowledgement, a data file, or an error message corresponding to the request. A determination is made as to whether an "adapter not registered" error was received (decision 450). For example, if the adapter and shared device are communicating using a SCSI protocol, the error message may be "UNIT ATTENTION" with "REGISTRATION PREEMPTED" as additional information.

If an "adapter not registered" error was not received, decision 450 branches to "No" branch 452 which loops back to process the next system request. This looping continues until an "adapter not registered" error is received corresponding to the adapter's request to the shared device, at which point decision 450 branches to "Yes" branch 458.

A determination is made as to whether the adapter was the prior reservation owner corresponding to the device and may be receiving the error due to being preempted by another device (decision 460). The determination is based upon the status of the adapter's internal reservation owner flag. The adapter would have set its internal reservation owner flag to "TRUE" when it obtain reservation ownership of the shared device.

If the adapter was the prior reservation owner (e.g. its owner flag=TRUE), decision 460 branches to "Yes" branch 462 whereupon the adapter re-registers with the device (step 465). Using the example described above, the adapter sends the command "PERSISTENT RESERVE OUT" with a service action of "REGISTER". The adapter changes the state of its internal owner flag from "TRUE" to "FALSE" (step 470). The adapter retrieves the system request stored in buffer store 425 and resends the request to the shared device (step 475).

On the other hand, if the adapter was not the prior reservation owner (e.g. internal reservation owner flag= "FALSE"), decision 460 branches to "No" branch 464 indicating a problem with the adapter. For example, the adapter may have been the prior reservation owner corresponding to the shared device and may have been preempted twice. The adapter would have set its internal reservation owner flag to "FALSE" during the first re-registration process.

An error condition is sent to the host system at step 480, and adapter operation is halted (step 490) until further notice. Adapter communication processing ends at 495.

Figure 5:
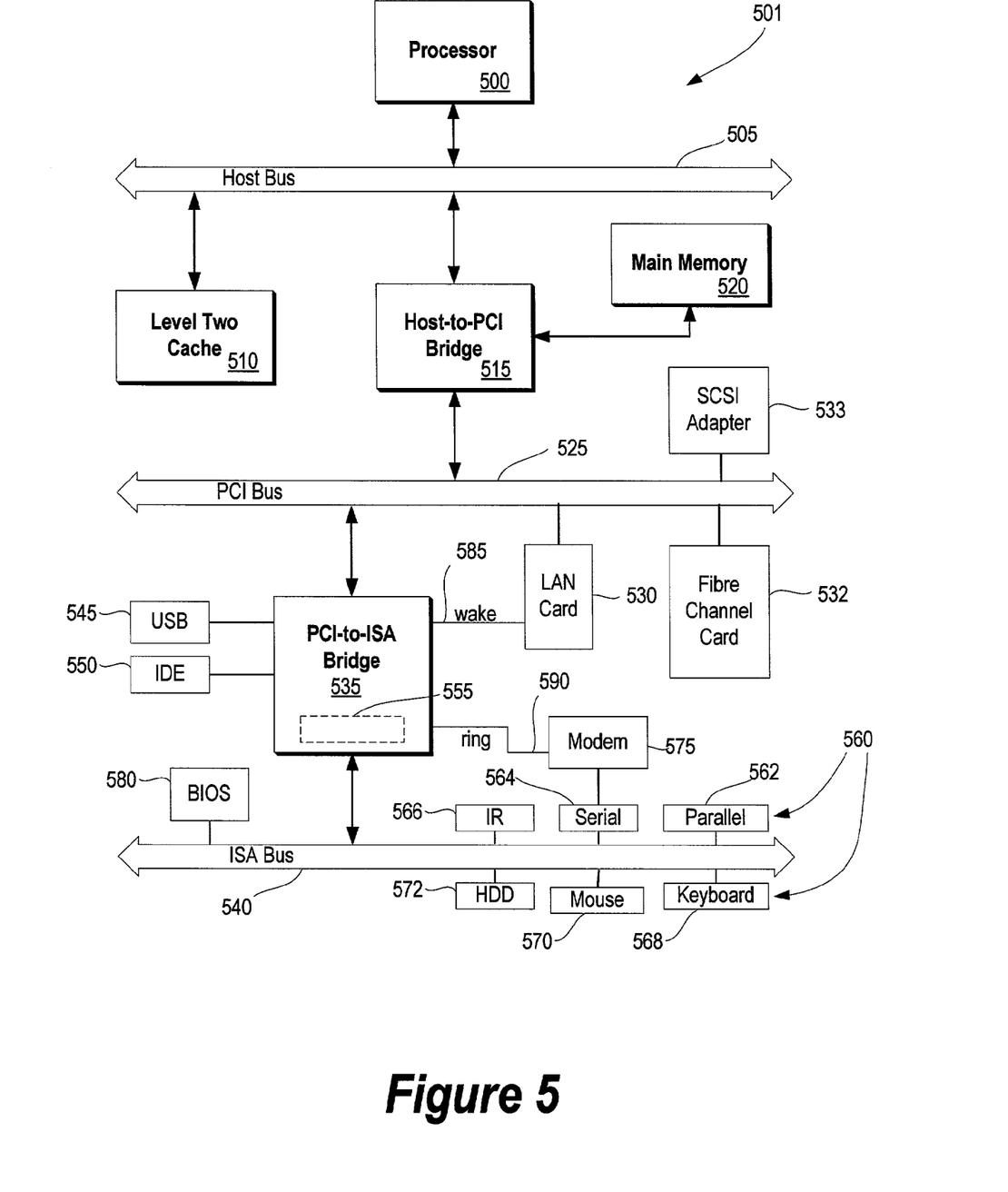
FIG. 5 is a block diagram of an information handling system capable of implementing the present invention.

FIG. 5 illustrates information handling system 501 which is a simplified example of a computer system capable of performing the server and client operations described herein. Computer system 501 includes processor 500 which is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530, Fibre Channel card 532, and SCSI adapter 533. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices can be attached to various interfaces 560 (e.g., parallel interface 562, serial interface 564, infrared (IR) interface 566, keyboard interface 568, mouse interface 570, and fixed disk (HDD) 572) coupled to ISA bus 540. Alternatively, many I/O devices can be accommodated by a super I/O controller (not shown) attached to ISA bus 540.

BIOS 580 is coupled to ISA bus 540, and incorporates the necessary processor executable code for a variety of low-level system functions and system boot functions. BIOS 580 can be stored in any computer readable medium, including magnetic storage media, optical storage media, flash memory, random access memory, read only memory, and communications media conveying signals encoding the instructions (e.g., signals from a network). In order to attach computer system 501 to another computer system to copy files over a network, LAN card 530 is coupled to PCI bus 525 and to PCI-to-ISA bridge 535. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of an adapter communicating with a shared device, said method comprising:
   registering with the shared device;
   acquiring reservation ownership of the shared device;
   setting an ownership flag at the adapter indicating ownership of the reservation;
   receiving an error message from the shared device after setting the ownership flag;
   checking the status of the ownership flag at the adapter in response to receiving the error message;
   re-registering with the shared device in response to the checking; and
   indicating loss of the reservation ownership by resetting the ownership flag in response to the checking.

2. The method as described in claim 1 wherein a SCSI protocol is used in communicating with the shared device.

3. The method as described in claim 1 wherein the error message is in response to a preemption initiated from a second adapter.

4. The method as described in claim 1 wherein the error message is received in response to the adapter sending a request to the shared device, the method further comprising:
   resending the request to the shared device in response to the re-registering.

5. The method as described in claim 1 further comprising:
   receiving a second error message from the shared device after the resetting;
   determining that the ownership flag is reset in response to receiving the second error message; and
   halting communication with the shared device in response to the determining.

6. The method as described in claim 1 further comprising:
   determining at a second adapter that there is a reservation owner of the shared device;
   sending a preemption request to the shared device to preempt the adapter's reservation ownership and registration to the shared device in response to the determination; and
   setting a second ownership flag at the second adapter indicating ownership of the reservation by the second adapter.

7. The method as described in claim 1 further comprising:
   preempting the adapter's ownership of the shared device by sending a preemption request to the shared device from a second adapter;
   determining that the adapter has re-registered with the shared device; and
   preempting the adapter a second time in response to the determination.

8. An information handling system comprising:
   one or more processors;
   a memory accessible by the processors;
   one or more nonvolatile storage devices accessible by the processors;

a SCSI adapter to connect the information handling system to a shared device;
a memory in the SCSI adapter to store flag and request information;
a SCSI adapter tool to communicate with the shared device, the SCSI adapter tool including;
means for registering with the shared device;
means for acquiring reservation ownership of the shared device;
means for setting an ownership flag at the SCSI adapter indicating ownership of the reservation by the SCSI adapter;
means for receiving an error message from the shared device after setting the ownership flag;
means for checking the status of the ownership flag at the adapter in response to receiving the error message;
means for re-registering with the shared device in response to the checking; and
means for indicating loss of the reservation ownership by resetting the ownership flag in response to the checking.

9. The information handling system as described in claim 8 wherein the error message is in response to a preemption initiated from a second SCSI adapter.

10. The information handling system as described in claim 8 wherein the error message is received in response to the SCSI adapter sending a request to the shared device, the method further comprising:
means for resending the request to the shared device in response to the re-registering.

11. The information handling system as described in claim 8 further comprising:
means for receiving a second error message from the shared device after the resetting;
means for determining that the ownership flag is reset in response to receiving the second error message; and
means for halting communication with the shared device in response to the determining.

12. The information handling system as described in claim 8 further comprising:
means for determining at a second SCSI adapter that there is a reservation owner of the shared device;
means for sending a preemption request to the shared device to preempt the SCSI adapter's reservation ownership and registration to the shared device in response to the determination; and
means for setting a second ownership flag at the second adapter indicating ownership of the reservation by the second SCSI adapter.

13. The information handling system as described in claim 8 further comprising:
means for preempting the SCSI adapter's ownership of the shared device by sending a preemption request to the shared device from a second SCSI adapter;
means for determining that the SCSI adapter has re-registered with the shared device; and
means for preempting the SCSI adapter a second time in response to the determination.

14. A computer program product stored in a computer operable media for an adapter communicating with a shared device, said computer program product comprising:
means for registering with the shared device;
means for acquiring reservation ownership of the shared device;
means for setting an ownership flag at the adapter indicating ownership of the reservation;
means for receiving an error message from the shared device after setting the ownership flag;
means for checking the status of the ownership flag at the adapter in response to receiving the error message;
means for re-registering with the shared device in response to the checking; and
means for indicating loss of the reservation ownership by resetting the ownership flag in response to the checking.

15. The computer program product as described in claim 14 wherein a SCSI protocol is used in communicating with the shared device.

16. The computer program product as described in claim 14 wherein the error message is in response to a preemption initiated from a second adapter.

17. The computer program product as described in claim 14 wherein the error message is received in response to the adapter sending a request to the shared device, the computer program product further comprising:
means for resending the request to the shared device in response to the re-registering.

18. The computer program product as described in claim 14 further comprising:
means for receiving a second error message from the shared device after the resetting;
means for determining that the ownership flag is reset in response to receiving the second error message; and
means for halting communication with the shared device in response to the determining.

19. The computer program product as described in claim 14 further comprising:
means for determining at a second adapter that there is a reservation owner of the shared device;
means for sending a preemption request to the shared device to preempt the adapter's reservation ownership and registration to the shared device in response to the determination; and
means for setting a second ownership flag at the second adapter indicating ownership of the reservation by the second adapter.

20. The computer program product as described in claim 14 further comprising:
means for preempting the adapter's ownership of the shared device by sending a preemption request to the shared device from a second adapter;
means for determining that the adapter has re-registered with the shared device; and
means for preempting the adapter a second time in response to the determination.

* * * * *